Sept. 15, 1970  P. R. CORN  3,529,214
LIGHT RESPONSIVE CONTROL SYSTEM
Filed Dec. 26, 1967  3 Sheets-Sheet 1
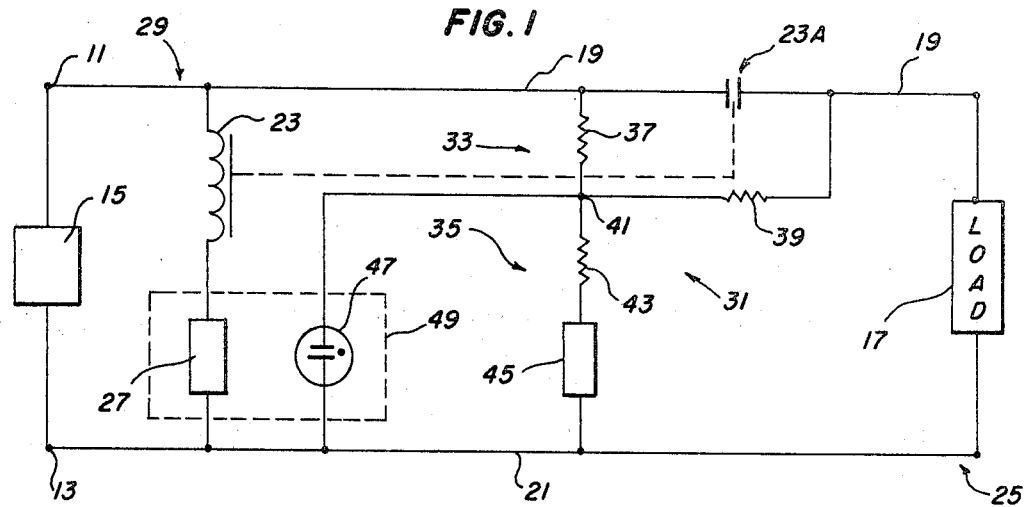
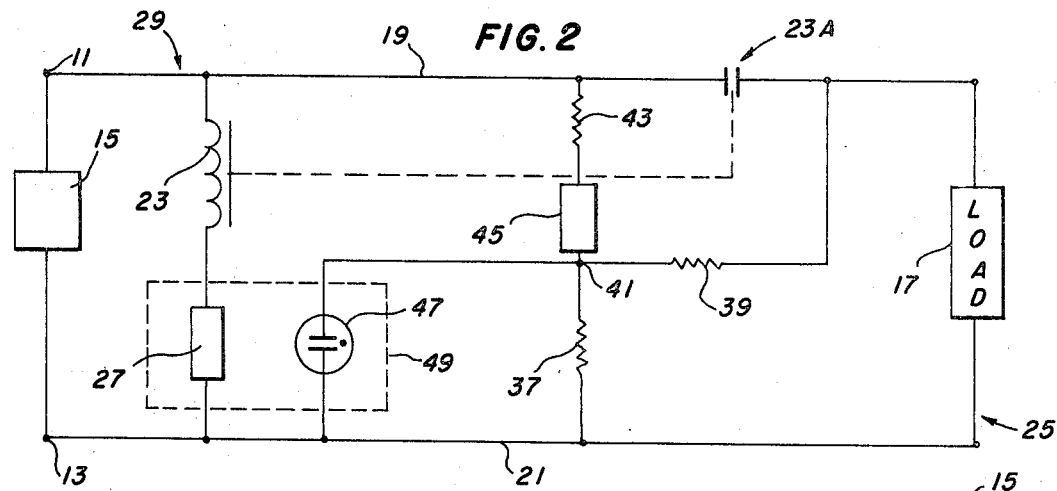
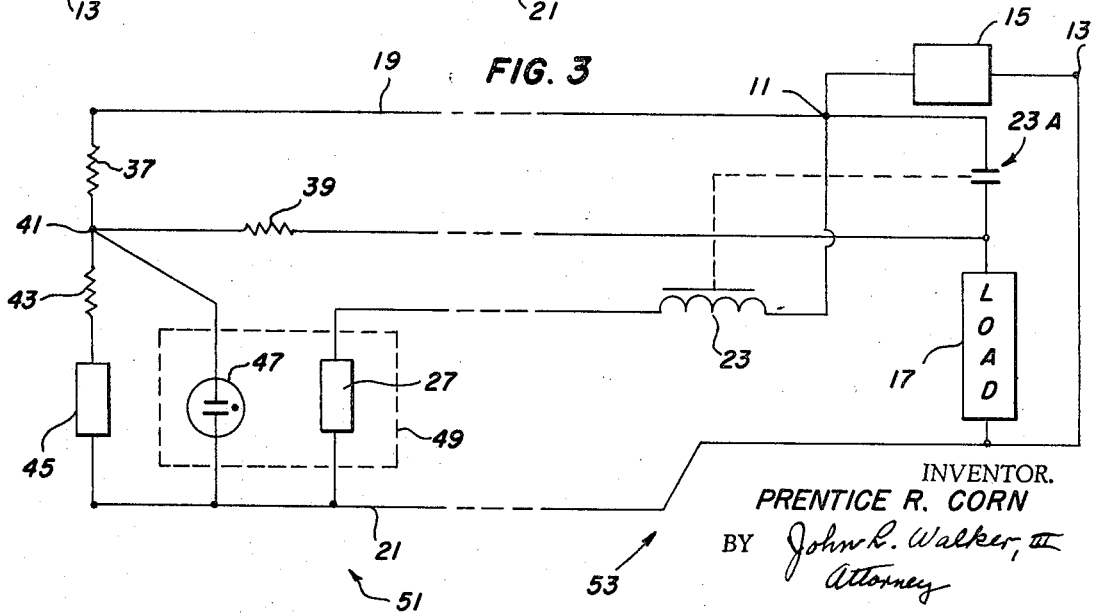
INVENTOR.
PRENTICE R. CORN
BY John R. Walker, III
Attorney

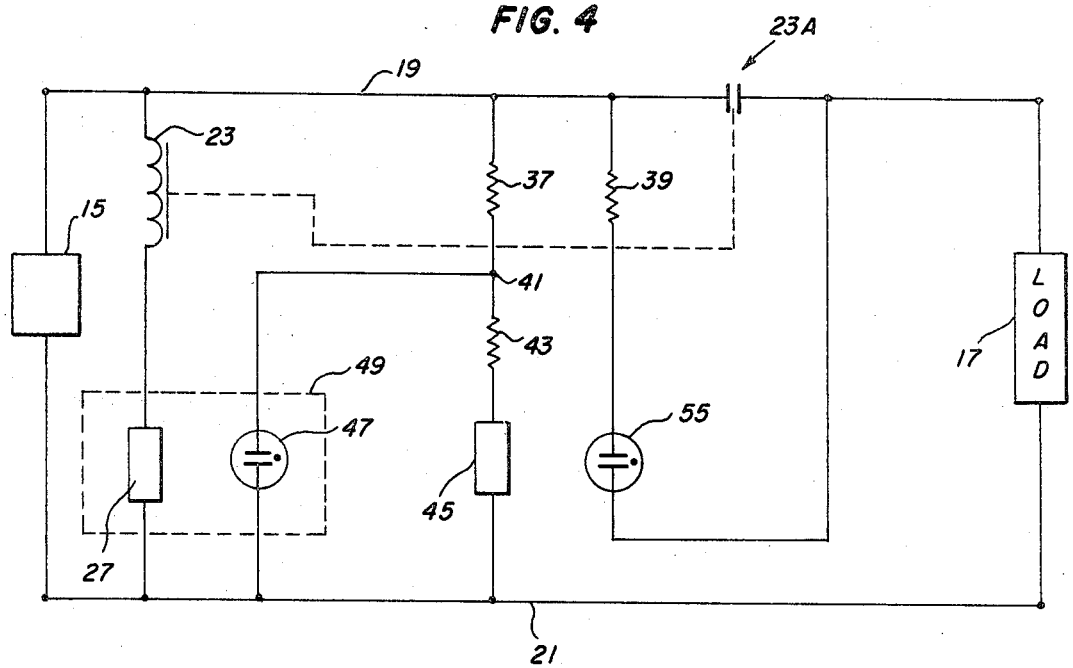
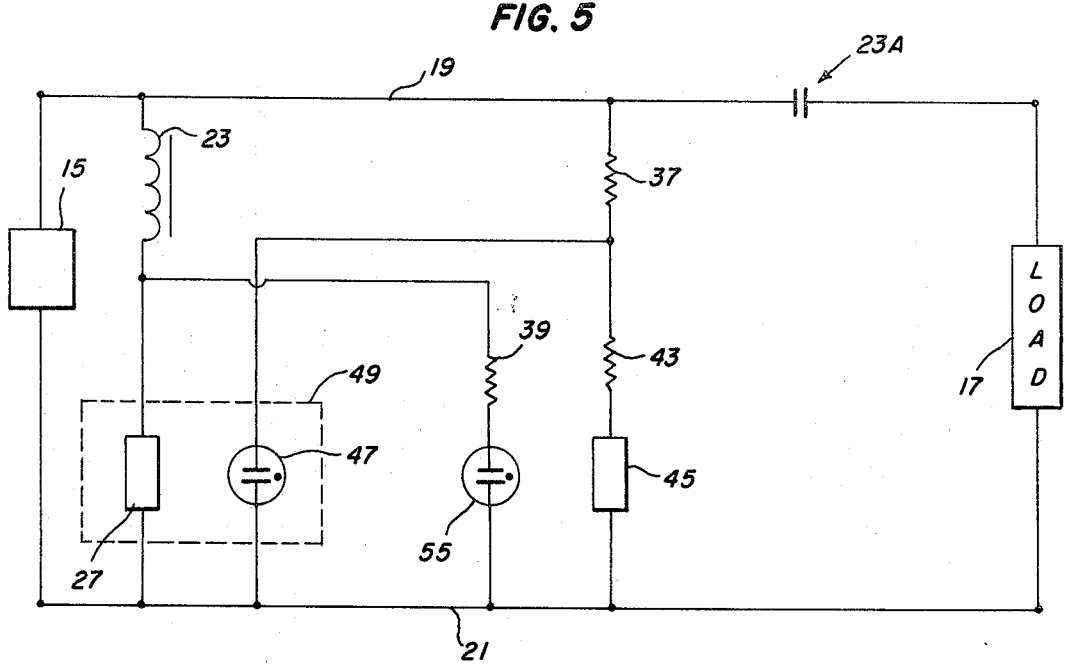

Sept. 15, 1970         P. R. CORN          3,529,214
           LIGHT RESPONSIVE CONTROL SYSTEM
Filed Dec. 26, 1967                    3 Sheets-Sheet 3

INVENTOR.
PRENTICE R. CORN
BY John R. Walker, III
    Attorney

United States Patent Office 3,529,214
Patented Sept. 15, 1970

3,529,214
LIGHT RESPONSIVE CONTROL SYSTEM
Prentice R. Corn, Memphis, Tenn., assignor to American Electric Manufacturing Corporation, Southaven, Miss., a corporation of Tennessee
Filed Dec. 26, 1967, Ser. No. 693,601
Int. Cl. H01h 47/24
U.S. Cl. 317—124                                    8 Claims

ABSTRACT OF THE DISCLOSURE

A control system which includes a relay having a coil and a switch, a source of power, and an electrical device or load to be controlled by the relay switch. The relay actuating means includes an enclosed photo-amplifier consisting of a first photo-conductor and illuminating means therefor. Also included is a second photo-conductor exposed to the ambient light for causing actuation of the above mentioned illuminating means responsive to changes in the ambient light. Various modifications are shown for accentuating the effect of the illuminating means on the first photo-conductor, and a modification is shown for delaying actuation of the illuminating means following sudden flashes of light on the second photo-conductor.

BACKGROUND OF THE INVENTION

Field of the invention

The invention relates to switch circuitry sensitive to a change in light level. The invention is particularly useful for automatically turning on lights, such as street luminaires, at night and off at sunrise.

Description of the prior art

Prior devices have included circuit controlling means embodying light-sensitive or photo-conductive cells. For example, Pat. No. Re. 19,199 shows a street lighting system in which is provided an electro-magnetic circuit controller for controlling the energization of street lights, a light sensitive cell for controlling an electro-magnetic relay and an auxiliary lighting unit, the energization of which is controlled directly by the electro-magnetic relay and secondarily by the light sensitive cell. In the apparatus of Pat. No. Re. 19,199, the photo-conductive cell and a lamp are enclosed in a box with an opening therein through which the ambient light strikes the photo-conductive cell.

Another example of a relay being controlled by a photo-conductor is shown in Pat. No. 3,151,280. In this device there is a photo-electric switch, a photo-conductive element and a neon lamp. The photo-conductive element or cell is actuated by the ambient light which cell in turn actuates the switch, which in turn causes the neon light to switch on and illuminate the photo-conductive cell.

SUMMARY OF THE INVENTION

The invention provides control means for actuating a relay in a control system, which control means includes a first photo-conductor, illuminating means for the first photo-conductor, and means including a second photo-conductor for actuating said illuminating means responsive to changes in ambient light to cause actuation of the relay. Various differential feedback means are provided for accentuating the effect of said illuminating means on the first photo-conductor to insure positive actuation of the relay. In addition, time delay means is provided for delaying the actuation of the illuminating means following sudden flashes of light on the second photo-conductor.

The invention provides for improved operation of relays controlled by photo-conductors; provides a circuit that will allow the use of normally open relay contacts for better load handling capabilities; provides a circuit to eliminate relay contact chatter caused by slowly changing coil voltage at pick-up and drop-out; and provides a circuit with means of controlling on and off point (differential) independent of one another within limits.

One feature of the invention is the use of one low power photo-conductor to trigger a neon lamp photo-conductor device similar in operation to a solid state switch. This allows the use of a less sensitive relay for better load handling and/or less cost.

Another feature is that the relay or load actuating device is no longer a part of the calibration circuit and can be mounted at a remote place.

Still another feature of the present invention is to provide a voltage divider means responsive to changes in the ambient light to cause actuation of the relay.

BRIEF DESCRIPTION OF THE DRAWINGS

FIG. 1 is a schematic circuit diagram of a preferred embodiment.

FIGS. 2–6 are schematic circuit diagrams illustrating modifications of the invention.

DESCRIPTION OF THE PREFERRED EMBODIMENTS

Figure 6:
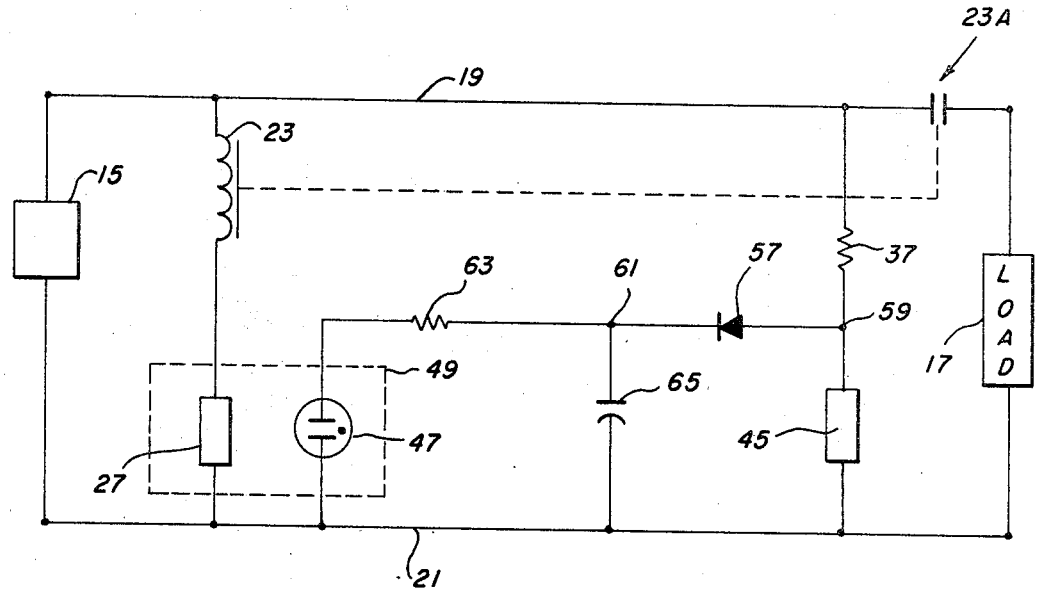

Referring to the preferred embodiment shown in FIG. 1, the terminals 11 and 13 are connected to a source of electrical power, which is preferably the alternating current supply 15. The electrical device or load 17 to be controlled is connected to terminals 11 and 13 by leads or lines 19, 21. It will be understood that when the present invention is used to automatically turn on lights such as street luminaires at night and off at sunrise, the load 17 represents the street lights and the description of the operation of the device for purposes of example will consider the load to be such street lights or luminaires. Interposed in line 19 is the relay switch or contacts 23a of a relay, which includes a relay coil 23 as well as the relay switch 23a. Relay switch 23a is arranged so that it is open when relay coil 23 is de-energized and is closed when the relay coil is energized. For purposes of identification the circuit hereinabove described will be designated first circuit 25, which includes, in series, source of electrical power 15, relay switch 23a and luminaires or load 17. Thus, it will be understood that when relay switch 23a is closed, the luminaires 17 will be turned on, and when the relay switch is open, the luminaires will be turned off.

Relay coil 23 and a photo-conductor or photo-conductive cell 27 are connected in series across lines 19 and 21. For identification the numeral 29 designates this second circuit which includes, in series, relay coil 23, first photo-conductor 27 and a source of electrical power 15. Photo-conductor or photo-conductive cell 27 is of any suitable well-known type and its resistance varies depending upon the amount of light incident thereon. When illuminated, the photo-conductor 27 has a low resistance and when not illuminated, the photo-conductor has a high resistance.

A voltage divider 31 is connected between lines 19, 21 and includes divider portions 33, 35. Divider portion 33 includes a pair of resistors 37, 39 with one of the ends of each of the resistors being connected to a common terminal 41 and the other ends of the resistors being connected to opposite relay contacts 23a so that when the relay contacts or switch 23a is open the resistance of divider portion 33 comprises resistor 37 and when the switch 23a is closed, the divider portion 33 comprises the resistors 37, 39 in parallel.

Divider portion 35 comprises, in series, a resistor 43 and a second photo-conductor or photo-conductive cell 45 which are connected between terminal 41 and line 21. Photo-conductor 45 is similar to photo-conductor 27 and is of any suitable construction the resistance of which varies as heretofore described relative to photo-conductor 27, depending upon the amount of light incident thereon.

A first illuminating means which is preferably in the form of a neon lamp 47 is in position to illuminate and thereby actuate photo-conductor 27 and is connected in parallel with divider portion 35. In other words, neon lamp 47 is connected at one end to terminal 41 and at the other end to line 21.

Neon lamp 47 and photo-conductor 27 are preferably completely enclosed in an opaque enclosure shown schematically as at 49 which blocks out all ambient light, and the only light which photo-conductor 27 receives is from neon lamp 47. In contrast to this, photo-conductor 45 is exposed to the ambient light. During the daytime, the voltage across divider portion 35, that is, between terminal 41 and line 21, is less than the breakdown voltage of neon lamp 47 so that during the daytime the neon lamp 47 is off and photo-conductive cell 27 is in darkness (high resistant state) whereby the current will not energize relay coil 23. This means that the relay switch 23a is open and the luminaires 17 are off during the daytime.

The operation of the present invention to turn on the luminaires 17 at dusk is described as follows:

Starting with the circuit in the condition hereinabove described, that is, with luminaires 17 off, at dusk when the ambient light decreases on photo-conductor 45, it increases the resistance of photo-conductor 45, causing an increase in voltage drop across divider portion 35. When this increase in voltage reaches the breakdown voltage of neon lamp 47, the neon lamp will turn on and illuminate photo-conductor 27, which immediately drops the resistance of photo-conductor 27 to a low value allowing sufficient current to pass for energizing relay coil 23, which closes relay switch 23a and turns luminaire 17 on. The above snap action type operation is further accentuated to insure positive actuation of the relay and no chattering thereof by the differential feedback provided as follows: When relay coil 23 is energized as above described, which closes relay switch 23a, resistors 37, 39 are connected in parallel, as heretofore-described, which causes an increase in the voltage across neon lamp 47. This increases even more the light falling on photo-conductor 27, which drops its resistance even lower, providing increased current for relay coil 23 at the moment its switch 23a closed. At daybreak, the ambient light will cause a decrease in voltage drop across divider portion 35 so that neon lamp 47 will turn off and cause de-energizing of relay coil 23 which in turn through the opening of switch 23a turns off luminaires 17. It will be noted that the resistors 37, 39 determine the differential between on and off point. Thus, if the resistor 39 were made smaller, the differential would be greater and vice versa.

When it is desired to reverse the operation and close switch 23a when the light is increasing rather than decreasing, the operation of the voltage divider 31 should be reversed so that resistor 37 is reversed with resistor 43 and photo-conductor 45, as seen in FIG. 2. As will be noted, like components have been designated by the same numerals as the corresponding components of the circuit shown in FIG. 1.

FIG. 3, which is the same circuit as that of FIG. 1 but with the components arranged or grouped differently, illustrates one form of remote control the invention makes possible. It will be noted that no moving parts are required in the light-sensitive remote control unit 51 (which is the grouping of the components to the left in FIG. 3), and the load actuating device 53 (which is the group of components to the right in FIG. 3) is mounted with the load 17 to keep all heavy wiring at a minimum. It will be understood that the break in the leads or lines adjacent the middle portion of FIG. 3 represents or signifies that the leads or lines can be greatly elongated so that the unit 51 and device 53 can be remote from one another. The remote location of the calibrated remote unit 51 also provides additional protection from heat producing components for better calibration stability and longer life. The operation is the same as that heretofore described for the device of FIG. 1. The relay shown in FIG. 3 can be replaced without affecting calibration, or the remote control unit 51 only can be changed if a change in calibration is required. It should be noted that the present state of the art devices do not have this flexibility since their calibration is dependent on relay pick-up and drop-out values.

The modification shown in FIG. 4 illustrates another type of differential feedback consisting of resistor 39 and auxiliary illuminating means in the form of neon lamp 55 in series across relay switch 23a. When relay switch 23a is open, neon lamp 55 is on and its brilliance is controlled by resistor 39. Neon lamp 55 is positioned to provide some illumination to photo-conductor 45. Therefore, when switch 23a is opened, the resistance of photo-conductor 45 is driven lower aiding the turn-off of neon lamp 47, increasing the resistance of photo-conductor 27 providing a more positive drop-out of relay coil 23. When normal light controlling the device is reduced, the resistance of photo-conductor 45 increases until the breakdown voltage of neon lamp 47 is reached, as previously described for FIGS. 1 and 3, except the additional light being provided by neon lamp 55 must now be considered. When neon lamp 47 fires, the resistance of photo-conductor 27 drops, energizing relay coil 23 and closing switch 23a as previously except the closing of contacts 23a now turns off neon lamp 55 increasing the resistance of photo-conductor 45 which increases the voltage across neon lamp 47 driving the resistance of photo-conductor 27 lower increasing power to relay coil 23.

The circuit shown in FIG. 5 illustrates a modification of the invention with an anticipating amplifier and a differential feedback combined. The basic circuit remains the same except for resistor 39 and neon lamp 55 which are connected in parallel with photo-conductor 27. With a high light level on photocell 45 its resistance is low and the voltage drop across resistor 43 and photo-conductor 45 is below the maintaining voltage of neon lamp 47. The resistance of photo-conductor 27 is high with neon lamp 47 off and the voltage drop across it is above the breakdown voltage of neon lamp 55 which provides some illumination to photo-conductor 45.

A decrease in normal light controlling the device increases the resistance of photo-conductor 45 until the voltage drop across resistor 43 and photo-conductor 45 exceeds the breakdown voltage of neon lamp 47 which reduces the resistance of photo-conductor 27 when it fires. As the resistance of photo-conductor 27 decreases the voltage across it and neon lamp 55 goes down while voltage and current to relay coil 23 increases. Neon lamp 55 will drop below its maintaining voltage before relay coil 23 receives sufficient operating power reducing the light level on photocell 45.

Anticipating the relay action to come, neon lamp 55 has now extinguished and increased the resistance of photo-conductor 45 providing a voltage boost to neon lamp 47 decreasing the resistance of photo-conductor 27 providing more power to operate the relay coil 23. The entire circuit including the relay is aiding to decrease the resistance of photo-conductor 27 and provide more power to relay coil 23. As relay coil 23 begins to attract the armature, not shown, toward the core, not shown, the effective impedance of relay coil 23 increases decreasing the voltage drop across photo-conductor 27 as an additional assurance that neon lamp 55 will extinguish.

An increase in normal light on photo-conductor 45 reverses the operation by decreasing the resistance of photo-conductor 45 which reduces the voltage to neon lamp 47 below its holding voltage. When neon lamp 47 extinguishes, the resistance of photo-conductor 27 goes up increasing the voltage across it until the firing voltage of neon lamp 55 is reached. By proper selection of neon lamp 55 it will fire before the drop-out voltage across relay coil 23 is reached. The firing of neon lamp 55 will provide additional light to photo-conductor 45 decreasing its resistance even further providing additional assurance of positive turnoff of neon 47. The relay also will provide a boost in voltage to neon lamp 55 when its magnetic circuit opens decreasing its impedance causing more voltage to be dropped across photo-conductor 27.

Resistor 39 and/or location of neon lamp 55 will determine the differential between on and off point and amount of feedback for positive relay snap action.

The operation of neon lamp 55 by proper selection for relay operation parameters will anticipate the relay operation and provide its boosting function prior to relay operation eliminating most or all of the response time of neon lamp 47 and photo-conductor 27 in the feedback circuits of FIGS. 1–4.

The change in impedance of relay coil 23 acts as a backup system to assure that the boosting action and differential feedback will occur when the relay operates.

The circuit of FIG. 6 illustrates a modified embodiment of the invention which provides a time delay for the deenergization of the relay to prevent turnoff due to sudden flashes of light of relatively short duration such as lightning, car lights, etc. Resistor 37 and photo-conductor 45 are connected in series between lines 19 and 21. A diode 57 extends between a terminal 59 (between resistor 37 and photo-conductor 45) and a terminal 61. A current limiting resistor 63 extends between terminal 61 and neon lamp 47. A capacitor 65 extends between terminal 61 and line 21. With the circuit in an on condition (that is, with a very low ambient light level and with neon lamp 47 on, relay coil 23 energized and therefore the relay switch 23a closed to energize load 17) capacitor 65 is charged to the value of the RMS voltage drop across photo-conductor 45. If there is a sudden flash of light, the impedance of photo-conductor 45 is driven down by the light and the RMS voltage drop across photo-conductor 45 is lowered. The capacitor 65 now tries to discharge and the diode 57 blocks the discharge current from passing through photo-conductor 45. Capacitor 65 discharges through resistor 63 and neon lamp 47 with the impedance of resistor 63 and neon lamp 47 determining how long it takes to discharge capacitor 65. Neon lamp 47 stays on until the capacitor 65 discharges below the sustaining voltage of neon lamp 47. The actual time in seconds the neon lamp 47 is held in an on condition by the capacitor discharge above described is dependent on the values of the various components of the circuit and is limited only by the physical space available to hold the components. It will be understood that the time delay circuit of the resistor 63, capacitor 65 and diode 57 may be used equally well in any of the other previously described circuits.

Although preferred embodiments of the present invention have been described, it will be understood that various modifications in the disclosed structures may be made without departing from the scope of the invention.

I claim:
1. In a control system including a relay coil and a relay switch and including a first circuit comprising in series a source of electrical power, an electrical device to be controlled and said relay switch; control means for actuating said relay to control said electrical device responsive to changes in the ambient light comprising a second circuit including in series said relay coil, a first photo-conductor and a source of electrical power for providing current through said first photo-conductor and said relay coil to actuate said relay switch; illuminating means for said first photo-conductor; means including a second photo-conductor for actuating said illuminating means responsive to changes in ambient light to cause actuation of said relay; and differential feedback means for aiding in actuation of said relay.

2. The control system of claim 1 in which said differential feedback means comprises means including an auxiliary illuminating means for said second photo-conductor operable responsive to actuation of said relay to cause a sudden decrease in illumination of said second photo-conductor.

3. In a control system including a relay having a relay coil and a relay switch and including a first circuit comprising in series a source of electrical power, an electrical device to be controlled and said relay switch; control means for actuating said relay to control said electrical device responsive to changes in the ambient light comprising a second circuit including in series said relay coil, a first photo-conductor and a source of electrical power for providing current through said first photo-conductor and said relay coil to actuate said relay switch; illuminating means for said first photo-conductor; means including a second photo-conductor for actuating said illuminating means responsive to changes in ambient light to cause actuation of said relay; a diode and a capacitor in series to establish a diode-capacitor series, said diode-capacitor series being in parallel with said second photo-conductor to establish a combination of components with said diode being positioned to prevent discharge of said condenser through said second photo-conductor, a resistor in series with said combination of components and said illuminating means through which said condenser is adapted to discharge for delaying actuation of said illuminating means following sudden flashes of light on said second photo-conductor.

4. In a control system including a relay having a relay coil and a relay switch and including a first circuit comprising in series a source of electrical power, an electrical device to be controlled and said relay switch; control means for actuating said relay to control said electrical device responsive to changes in the ambient light comprising a second circuit including in series said relay coil, a first photo-conductor and a source of electrical power for providing current through said first photo-conductor and said relay coil to actuate said relay switch; voltage divider means including a pair of divider portions, one of said divider portions including a second photo-conductor responsive to changes in the ambient light to change the relative voltage drops across said divider portions, first illuminating means responsive to the voltage drop across one of said divider portions and in position to actuate said first photo-conductor for causing actuation of said relay in response to changes in said ambient light; and differential feedback means for aiding actuation of said relay.

5. The control system of claim 4 in which said differential feedback means comprises resistance means in one of said divider portions and means for changing the resistance of said resistance means responsive to actuation of said relay to accentuate the effect of said first illuminating means on said first photo-conductor.

6. In a control system including a relay having a relay coil and a relay switch and including a first circuit comprising in series a source of electrical power, an electrical device to be controlled and said relay switch; control means for actuating said relay to control said electrical device responsive to changes in the ambient light comprising a second circuit including in series said relay coil, a first photo-conductor and a source of electrical power for providing current through said first photo-conductor and said relay coil to actuate said relay switch; voltage divider means including a pair of divider portions, one of said divider portions including a second photo-conductor responsive to changes in the ambient light to change the relative voltage drops across said divider portions, first illuminating means responsive to the voltage drop across one of said divider portions and in position to actuate said first photo-conductor for causing actuation of said relay in response to changes in said ambient light; and normally illuminated auxiliary illuminating means in position to illuminate said second photo-conductor and extinguishable to an off condition responsive to actuation of said relay switch to accentuate the effect of said first illuminating means on said first photo-conductor.

7. In a control system including a relay having a relay coil and a relay switch and including a first circuit comprising in series a source of electrical power, an electrical device to be controlled and said relay switch; control means for actuating said relay to control said electrical device responsive to changes in the ambient light comprising a second circuit including in series said relay coil, a first photo-conductor and a source of electrical power for providing current through said first photo-conductor and said relay coil to actuate said relay switch; voltage divider means including a pair of divider portions, one of said divider portions including a second photo-conductor responsive to changes in the ambient light to change the relative voltage drops across said divider portions, first illuminating means responsive to the voltage drop across one of said divider portions and in position to actuate said first photo-conductor for causing actuation of said relay in response to changes in said ambient light; and normally illuminated auxiliary illuminating means in position to illuminate said second photo-conductor and extinguishable to an off condition responsive to a decrease in resistance of said first photo-conductor and extinguishable before the operation of said relay.

8. The control system of claim 7 which includes a resistor, and in which said auxiliary illuminating means comprises a neon lamp, said resistor and said neon lamp being in series to establish a circuit branch, said circuit branch being in parallel with said first photo-conductor, and the voltage drop across said first photo-conductor when said first illuminating means is off being above the breakdown voltage of said neon lamp.

References Cited
UNITED STATES PATENTS

| | | | |
|---|---|---|---|
| 2,838,719 | 6/1958 | Chitty | 317—124 |
| 3,081,417 | 3/1963 | Collier | 317—124 |
| 3,089,065 | 5/1963 | Worden | 317—124 XR |
| 3,151,280 | 9/1964 | Naylor | 317—124 |
| 3,210,611 | 10/1965 | Krenke | 317—124 XR |
| 3,248,549 | 4/1966 | Sanabria | 317—124 XR |
| 3,351,762 | 11/1967 | Adkins et al. | 317—124 XR |

WILLIAM M. SHOOP, Jr., Primary Examiner

U.S. Cl. X.R.

250—206; 307—117